United States Patent Office 3,637,785
Patented Jan. 25, 1972

---

3,637,785
CATALYTIC PREPARATION OF AROMATIC ISOCYANATES
Eric Smith, Madison, and Ehrenfried H. Kober, Hamden, Conn., assignors to Olin Mathieson Chemical Corporation
No Drawing. Filed Feb. 10, 1969, Ser. No. 798,105
Int. Cl. C07c *119/04*
U.S. Cl. 260—453 P          23 Claims

ABSTRACT OF THE DISCLOSURE

The process for preparing an organic isocyanate by reacting an organic nitro compound with carbon monoxide in the presence of a catalyst system comprising a halide of a noble metal and an amine compound of the formula:

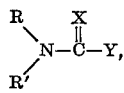

where R and R' are hydrogen, alkyl, aralkyl, aryl, alkaryl, and alkoxy aryl; X is sulfur, oxygen or NR·A, wherein A is an inorganic acid and Y is hydrogen, alkyl, aryl, alkaryl, alkoxyaryl, halogen, NRR' or SR. Preferred amine compounds include N,N-diphenyl formamide, N,N-dimethyl formamide, N,N-ditolyl formamide, N-tolyl-N-naphthyl formamide, N,N-diphenyl acetamide, N,N-ditolyl acetamide, N-phenyl-N-xylyl acetamide, thiocarbanilide, N-xylyl-N'-phenyl thiourea, N-tolyl-N'-phenyl thiourea, diphenyl carbamyl chloride, 2-methyl-1,3-diphenyl-2-thiopseudo urea. The noble metal halide is preferably a halide of palladium, rhodium, iridium, rhenium, platinum, and mixtures thereof. The catalyst system may also include molybdenum trioxide or another metal oxide.

---

This invention relates to an improved process for a preparation of organic isocyanates from organic nitro compounds in which a catalyst system comprising a halide of a noble metal and an amine compound is employed.

Organic isocyanates are used extensively in the preparation of urethane foams, coatings, and fibers, as well as in the preparation of insecticides, pesticides and the like. Commercial process for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technuique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride, and the like.

Other proposed simplified technique utilize other catalyst systems. For example, Belgian Pat. No. 672,405 entitled "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and an elevated temperature in the presence of:

(I) a catalyst system comprised of (A) at least one amine compound of the formula:

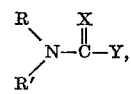

wherein R and R' are independently selected from the group consisting of hydrogen, alkyl, aryl, alkaryl, aralkyl, and alkoxyaryl; X is selected from the group consisting of oxygen, sulfur, or NR·A, wherein A is an inorganic acid and R has the same meaning as previously described; and Y is selected from the group consisting of hydrogen, alkyl, aryl, alkaryl, aralkyl, alkoxyaryl (all of which are represented by R above), halogen, NRR' and SR, wherein R and R' have the same meaning as previously described, and (B) at least one noble metal halide, or (II) a catalyst system comprised of a complex of a compound of I-A and a halide of I-B.

In R and R' above, the alkyl group contains between 1 and 8 carbon atoms, including methyl, ethyl, isopropyl, n-butyl, isoamyl, n-hexyl, isohexyl, n-octyl, etc., the aryl group contains between 6 and 12 carbon atoms, and the alkaryl, aralkyl and alkoxyaryl moieties each between 7 and 12 carbon atoms, such as phenyl, naphthyl, tolyl, xylyl, ethylphenyl, diethyltolyl, phenylmethyl, phenylethyl, phenylisobutyl, tolylmethyl, xylyl m-butyl, methoxyphenyl, ethoxytolyl, isopropoxyxylyl and the like. Useful halogen substituents of Y include chlorine, bromine, iodine and fluorine. A represents an inorganic acid such as hydrochloric, nitric, sulfuric, etc. The organic moieties referred to above may also contain halogen substituents such as chlorine, bromine and iodine.

Any organic nitro compound capable of being converted to an organic isocyanate may be employed as a reactant. Generally, aromatic, cycloaliphatic, and aliphatic mono- or polynitro compound, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) Nitrocycloalkanes (a) Nitrocyclobutane
(b) Nitrocyclopentane
(c) Nitrocyclohexane
(d) Dinitrocyclohexanes
(e) Bis(nitrocyclohexyl)methanes (III) Nitroalkanes (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted organic nitro compounds which can be used are as follows:

(1) o-nitrotoluene
(2) m-nitrotoluene
(3) p-nitrotoluene
(4) o-nitro-p-xylene
(5) 2-methyl-1-nitronaphthalene
(6) m-dinitrobenzene
(7) p-dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) $\alpha,\alpha'$-dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) $\alpha,\alpha$-dibromo-p-nitrotoluene
(42) $\alpha$-bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-Nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including the various nitrated toluenes and the nitrated xylenes; nitrated biphenyl and nitrated diphenylmethylene. Other preferred reactants include bis(nitrophenoxy)alkylenes and bis(nitrophenoxy) alkyl ethers. Generally, the organic nitro compounds and substituted organic nitro compounds contain between 1 and about 20 carbon atoms, and preferably between about 6 and about 14 carbon atoms.

The catalyst system of this invention is comprised of at least one amine compound and at least one noble metal halide. The amine compounds useful in this invention have the formula:

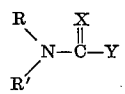

wherein R, R', X and Y have the same meaning as previously defined.

Examples of amine compounds useful in the catalyst system of this invention include:

(I) Ureas (1) urea
(2) N-phenyl urea
(3) N-tolyl urea
(4) N,N'-diphenyl urea (carbanilide)
(5) N-xylyl urea
(6) N-ethylphenyl urea
(7) N-naphthyl urea
(8) N-diethylxylyl urea
(9) N-methyl urea
(10) N-methoxyphenyl urea
(11) N,N'-ditolyl urea
(12) N,N'-diethyltolyl urea
(13) tetraphenyl urea
(14) N,N-diphenyl-N',N'-ditolyl urea
(15) N,N-diphenyl-N-xylyl-N',N'-dinaphthyl urea
(16) N-methyl-N-isopropyl urea
(17) N-amyl-N'-phenyl urea
(18) N-phenyl-N'-phenylpropyl urea
(19) N-octyl-N'-xylyl urea
(20) N-octyl-N'-butoxytolyl urea
(21) N,N'-dimethyl urea
(22) N-methyl-N'-xylyl urea
(23) N-ethyl urea
(24) N,N-diethyl urea
(25) N,N'-diisopropyl urea
(26) N-methyl-N-ethyl urea
(27) N,N-diisoamyl urea
(28) N-heptyl-N-hexyl urea
(29) N-isooctyl-N'-methyl urea
(30) N-octyl-N'-phenyl urea
(31) N-isohexyl urea
(32) N-isohexyl-N-isopropoxytolyl urea
(33) N-n-octyl urea (II) Amides

(34) Formamide
(35) N-methyl formamide
(36) N-isoamyl formamide
(37) N,N-dihexyl formamide
(38) N-octyl formamide
(39) N,N-diisopropyl formamide
(40) N-phenyl formamide
(41) N,N-diphenyl formamide
(42) N-methyl-N-phenyl formamide
(43) N-phenyl-N-tolyl formamide
(44) N-propylphenyl formamide
(45) acetamide
(46) N-methyl acetamide
(47) N-isopropyl acetamide
(48) N,N-dipropyl acetamide
(49) N-amyl acetamide
(50) N-phenyl acetamide
(51) N,N-diphenyl acetamide
(52) N-ethylphenyl acetamide
(53) N,N-ditolyl acetamide
(54) N,N-dixylyl acetamide
(55) N,N-dinaphthyl acetamide
(56) N,N-isohexyl acetamide
(57) N-heptyl acetamide
(58) N,N'-dioctyl acetamide
(59) N-tolyl acetamide
(60) N-phenylethyl acetamide
(61) N-phenyl-N-xylyl acetamide
(62) N-butyl-N-phenyl acetamide
(63) N-tolyl-N-phenyl acetamide
(64) N-phenyl-N-naphthyl acetamide
(65) N-phenyl-N-ethoxyphenyl acetamide
(66) benzamide
(67) N-ethyl benzamide
(68) N-isopropyl-N-phenyl benzamide
(69) N,N-diamyl benzamide
(70) N,N-diphenyl benzamide
(71) N-isooctyl benzamide
(72) N-ethoxytolyl benzamide
(73) N-butylphenyl benzamide
(74) N-phenyl benzamide
(75) N,N'-diphenyl benzamide
(76) propionamide
(77) N-methyl propionamide
(78) N-phenyl propionamide
(79) N-isobutyl propionamide
(80) N-methyl-N-phenyl propionamide
(81) N,N-di-n-butyl propionamide
(82) N-phenylethyl propionamide
(83) N-isooctyl propionamide
(84) N-ethoxyphenyl propionamide
(85) N-xylyl propionamide
(86) n-butyramide
(87) N-ethyl n-butyramide
(88) N-ethylphenyl n-butyramide
(89) N-isopropyl n-butyramide
(90) N,N-diisohexyl n-butyramide
(91) Isobutyramide
(92) N-phenyl isobutyramide
(93) N-methyl isobutyramide
(94) N-methyl-N-naphthyl isobutyramide
(95) N,N-di-n-propyl isobutyramide
(96) N,N-dixylyl isobutyramide
(97) N-isohexyl-N-isooctyl isobutyramide
(98) n-valeramide
(99) N-methyl n-valeramide
(100) N-naphthyl n-valeramide
(101) N,N-di-n-isopropyl n-valeramide
(102) N-octyl n-valeramide
(103) N-octyl-N-phenyl n-valeramide
(104) isovaleramide
(105) N-ethyl isovaleramide
(106) N,N-diethyl isovaleramide
(107) N-propyl isovaleramide
(108) N,N-di-n-isooctyl isovaleramide
(109) caproamide
(110) N-methyl caproamide
(111) N-phenyl-N-ethyl caproamide
(112) N-isobutyl caproamide
(113) N,N-diamyl caproamide
(114) heptanamide
(115) N-methyl heptanamide
(116) N-methyl-N-xylyl heptanamide
(117) N-ethyl heptanamide (118) N-phenyl heptanamide
(119) N,N-diisoamyl heptanamide
(120) N-octyl heptanamide
(121) caprylamide
(122) N-ethyl caprylamide
(123) N,N-diphenyl caprylamide
(124) N-isobutyral caprylamide
(125) N,N-diethyl caproamide
(126) N-ethyltolyl caproamide
(127) N-amyl caproamide
(128) N,N-dioctyl caproamide
(129) pelargonamide
(130) N-methyl pelargonamide
(131) N-naphthyl pelargonamide
(132) N-isopropyl pelargonamide
(133) N-methyl-N-phenyl pelargonamide
(134) N,N-dibutyral pelargonamide
(135) N-heptyl pelargonamide
(136) N,N-diisooctyl pelargonamide (III) Thioureas (137) Thiourea
(138) N-phenyl thiourea
(139) N-tolyl thiourea
(140) N-methoxyphenyl-N'-tolyl thiourea
(141) N,N'-diphenyl thiourea
(142) N,N-diphenyl thiourea
(143) N-xylyl thiourea
(144) N-ethylphenyl thiourea
(145) N-naphthyl thiourea
(146) N-diethylxylyl thiourea
(147) N-methyl thiourea
(148) N-methyl-N-naphthyl thiourea
(149) N,N'-ditolyl thiourea
(150) N-methyl-N-isopropyl thiourea
(151) N-ethyl-N'-isooctyl thiourea
(152) N-amyl-N'-phenyl thiourea
(153) N-octyl-N'-xylyl thiourea
(154) N,N'-dimethyl thiourea
(155) N-ethyl thiourea
(156) N-ethyl-N-methoxyphenyl thiourea
(157) N,N-diethyl thiourea
(158) N,N-diethylxylyl thiourea
(159) N,N'-diisopropyl thiourea
(160) N-methyl-N-ethyl thiourea
(161) N,N'-diisoamyl thiourea
(162) N-heptyl-N-hexyl thiourea
(163) N-isooctyl-N'-methyl thiourea
(164) N,N'-diisooctyl thiourea
(165) N-isohexyl thiourea
(166) N-n-octyl thiourea (IV) Thioamides (167) Thioformamide
(168) N-methyl thioformamide
(169) N-isoamyl thioformamide
(170) N,N-dihexyl thioformamide
(171) N-octyl thioformamide
(172) N,N-diisopropyl thioformamide
(173) N-phenyl thioformamide
(174) N,N-diphenyl thioformamide
(175) N,N-dixylyl thioformamide
(176) N-naphthyl thioformamide
(177) N-isobutoxyphenyl thioformamide
(178) N-methyl thioacetamide
(179) N-isopropyl thioacetamide
(180) N,N-dipropyl thioacetamide
(181) N-amyl thioacetamide
(182) N-phenyl thioacetamide
(183) N,N-diphenyl thioacetamide
(184) N-ethyltolyl thioacetamide
(185) N,N-ditolyl thioacetamide
(186) N,N-dixylyl thioacetamide
(187) N-naphthyl thioacetamide
(188) N,N-dinaphthyl thioacetamide
(189) N-hexoxyphenyl thioacetamide
(190) N,N-isohexyl thioacetamide
(191) N-phenyl-N-ethylphenyl thioacetamide
(192) N-heptyl thioacetamide
(193) N,N-dioctyl thioacetamide
(194) N-phenyl thiobenzamide
(195) N,N-ditolyl thiobenzamide
(196) N-methoxyphenyl thiobenzamide
(197) N,N-dinaphthyl thiobenzamide (V) Carbamyl halides (198) Carbamyl chloride
(199) Carbamyl bromide
(200) Carbamyl iodide
(201) Carbamyl fluoride
(202) N-methyl carbamyl chloride
(203) N-isopropyl carbamyl iodide
(204) N-hexyl carbamyl bromide
(205) N-isooctyl carbamyl fluoride
(206) N-phenyl carbamyl chloride
(207) N,N-diphenyl carbamyl bromide
(208) N-xylyl-N-naphthyl carbamyl iodide
(209) N-ethyltolyl carbamyl bromide
(210) N-ethoxyphenyl carbamyl iodide
(211) N-napthyl carbamyl chloride (VI) Isothiouronium salts (212) S-methyl isothiouronium hydrochloride
(213) S-ethyl isothiouronium acid nitrate
(214) N,N'-diethyl-S-ethyl isothiouronium hydrochloride
(215) N-isopropyl-S-methyl isothiouronium hydrobromide
(216) N,N'-di-n-butyl-S-n-propyl isothiouronium hydroiodide
(217) S-phenyl isothiouronium hydrochloride
(218) S-ethylphenyl isothiouronium hydrobromide
(219) N-tolyl-S-xylyl isothiouronium hydroiodide
(220) N,N'-diphenyl-S-phenyl isothiouronium hydrochloride
(221) N,N-diethyl-N'-methyl-S-n-propyl isothiouronium sulfate
(222) N-methyl-N-tolyl-S-octyl isothiouronium sulfate
(223) N-methyl-N'-naphthyl-S-amyl isothiouronium sulfate (VII) Amidines (224) Acetamidine
(225) N-phenyl acetamidine
(226) N-tolyl propionamidine
(227) N-methyl acetamidine
(228) N-ethylphenyl acetamidine
(229) N-isohexyl acetamidine
(230) N,N'-diphenyl acetamidine
(231) Isobutyramidine
(232) N,N'-ditolyl isobutyramidine
(233) Caproamidine
(234) N,N-diisoctyl caproamidine
(235) N-isopropyl pelargonamidine
(236) N-naphthyl-N-ethyl acetamidine
(237) N-ethyl acetamidine
(238) N-propyl-N-tolyl acetamidine
(239) N-isoamyl N-phenyl acetamidine
(240) Benzamidine
(241) N-methyl benzamidine
(242) N-phenyl benzamidine
(243) N,N'-diethyltolyl benzamidine (244) N,N-dipropyl benzamidine
(245) N-ethoxyphenyl benzamidine
(246) N-tolylpropyl benzamidine (VIII) Guanidines (247) Guanidine
(248) 1-methyl guanidine
(249) 1,1-diethyl guanidine
(250) 1-methyl-2-propyl-3-propyl guanidine
(251) 1-propyl guanidine
(252) 3-phenyl guanidine
(253) 3,3-dinaphthyl guanidine
(254) 1-phenyl-3-xylyl guanidine
(255) 1-tolyl guanidine In the process of this invention certain selected amine compounds of the formula:

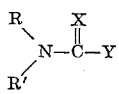

wherein R, R', X and Y have the same meaning as previously described, have been found to be particularly efficacious when used with the noble metal halides. Especially useful amine compounds falling within this classification include:

N,N-diphenyl formamide
N,N-dimethyl formamide
N,N-ditolyl formamide
N-tolyl-N-naphthyl formamide
N,N-diphenyl acetamide
Carbanilide
Tetraphenyl urea
Thiocarbanilide
N-phenyl thiourea
N,N-diphenyl thiourea
Diphenyl carbamyl chloride
2-methyl-1,3-diphenyl-2-thio-pseudo urea The second component of the catalyst system is at least one halide of a noble metal. Noble metals include ruthenium, rhenium, rhodium, palladium, osmium, iridium, platinum, silver and gold. The halides of palladium, rhodium, platinum, iridium, rhenium and mixtures thereof are particularly preferred noble metal halides. Typical examples of suitable halides include palladous bromide, palladous chloride, palladous fluoride, palladous iodide, rhodium tribromide, rhodium trichloride, rhodium trifluoride, rhodium triiodide; ruthenium dichloride, ruthenium trichloride, ruthenium tetrachloride; osmium dichloride, osmium trichloride, osmium tetrachloride; platinic bromide, platinous bromide, platinic chloride, platinous chloride, platinic fluoride, platinous iodide, platinic iodide, rhenium trichloride, rhenium tetrachloride, iridium tribromide, rhenium hexafluoride, rhenium tribromide, iridium tribromide, iridium tetrabromide, iridium triiodide, iridium tetraiodide, and mixtures thereof. An especially useful group of noble metal halides includes palladous chloride, rhodium trichloride, iridium trichloride, platinic chloride ,and mixtures thereof. Oxides of the noble metals may also be employed and the term "halides of a noble metal" is used throughout the description and claims is intended to include the above-mentioned metal halides as well as the corresponding oxides, such as palladium oxide, rhodium oxide, platinum oxide, etc., and the like.

The use of the amine compound in catalytic combination with the noble metal halide is generally accomplished by adding the amine compound and the noble metal halide separately to the reaction system or, if desired, they may be premixed prior to adding the organic nitro compound. However, it has also been determined that complexes which can be formed by reacting the noble metal halide and the amine compound also can be utilized very effectively as the catalyst system in the conversion of the nitro compounds to isocyanates with carbon monoxide. These complexes are conveniently prepared by the reaction of the amine compound with the previously recited noble metal halides. For example, equimolar quantities of palladous chloride and N,N-diphenyl formamide are heated together in refluxing ortho-dichlorobenzene until the former dissolves. The solution is then cooled and evaporated to dryness under reduced pressure, yielding crystals of a complex formed from the palladous chloride and the N,N-diphenyl formamide. Thus, it is to be understood that in the practice of this invention the use of the amine compound in combination with the use of the noble metal halide may involve either the separate addition of each to the reaction system or, if desired, the prior formation of a complex of the two materials and subsequent use thereof in the reaction.

The catalyst system can be self-supported or deposited on a support or carrier for dispersing the catalyst system to increase its effective surface. Aluminum, silica, carbon, barium sulfate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio of amine compound to the noble metal halide is generally between about .1 and about 10 and preferably between about .5 and about 4 but greater or lesser ratios may be employed if desired.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic or aromatic solvents, such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which is preferably provided with agitation means such as a stirrer or an external rocking mechanism. At start-up after purging the system with nitrogen gas, carbon monoxide is fed into the autoclave until a pressure is attained, at ambient temperature, which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continously as the reaction progresses. The reaction is believed to progress in accordance with the following equation:

(I)   $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide-containing gas streams greatly reduces the overall consumption of carbon monoxide.

The reaction temperature is generally maintained above about 25° C. and preferably between about 100° C. and about 250° C. Interior and/or exterior heating and cooling means may be employed to maintain the temperature of the reactor within the desired range.

The reaction time is dependent upon the organic nitro compound being reacted, temperature, pressure and on the amount of catalyst being charged, as well as the type of equipment being employed. Usually between one-half hour and 20 hours are required to obtain the desired degree of reaction, in a batch technique, but shorter or longer reaction times may be employed. In a continous process, the reaction may be much lower, i.e., substantially instantaneous, and residence time may be substantially less than batch reaction time.

The reaction can be carried out batchwise, semi-continously or continously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains an amine compound and a noble metal halide but also contains a third component comprised of certain metal oxides. Oxides suitable as a third component of the catalyst system include at least one oxide of an element selected from the group consisting of vanadium, molybdenum, tungsten, niobium, chromium, tantalum, and iron, as described in co-pending application Ser. No. 619,158, filed Feb. 28, 1967, for Process, by Schnabel et al. and Ser. No. 757,105, filed Sept. 3, 1968, for Noble Metal Catalyst System Containing Oxide of Iron by Rao et al. These elements, with the exception of iron, are found in Groups Va and VIa of the Periodic Table shown on p. 122 of Inorganic Chemistry by Moeller, John Wiley and Sons, Inc. 1952. Suitable oxides of this type include chromic oxide ($Cr_2O_3$), chromium dioxide ($CrO_2$), chromous oxide (CrO); molybdenum dioxide ($MoO_2$), molybdenum trioxide ($MoO_3$) and molybdenum sesquioxide ($Mo_2O_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$), vanadium pentoxide ($V_2O_5$), ferrous oxide (FeO) and ferric oxide ($Fe_2O_3$). Mixtures of two or more of these oxides may be employed as one component of the catalyst mixture. The proportion of the third component of the catalyst system, when one is employed, is generally equivalent to a weight ratio of the noble metal halide to the metal oxide in the catalyst system generally in the range between about 0.001:1 and about 25:1, and preferably in the range between about 0.005:1 and about 5:1.

The following examples are presented to described the invention more fully without any intention of being limited thereby. All parts and percentages are by weight unless otherwise specified.

EXAMPLE I

In this example, 2,4-dinitrotoluene (5.0 g.), palladous chloride (0.4 g., $2.26 \times 10^{-3}$ moles) and N,N-diphenylacetamide ($5.52 \times 10^{-3}$ moles) were charged to a clean, 100 ml. stainless steel autoclave (316 grade) together with orthodichlorobenzene solvent (5 ml.).

The autoclave was sealed after being so charged, then pressured with nitrogen and tested for leaks. Nitrogen was released and the autoclave was pressured with carbon monoxide to about 2500 p.s.i.g. During the reaction the autolave was rocked in a rocker (36 cycles per minute), and heated during one hour to 190° C., when the internal pressure rose to about 3800 p.s.i.g. This temperature was maintained for three hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solutions were combined with the filtrate and the resulting solution was subjected to a determination of its infrared spectrum to test for the presence of isocyanates (which possess a characteristic infrared light absorption at about 4.5 microns). The weight percentages of 2,4 - dinitrotoluene, 2,4 - toluene diisocyanate, 2 - isocyanato - 4 - nitrotoluene and 4 - isocyanato - 2 - nitrotoluene in the filtrate were determined by vapor phase chromatography. The conversion of 2,4 - dinitrotoluene was calculated to be 59 percent. The yield of 2,4-toluene diisocyanate and the combined yield of mononitrotolyl isocyanates were calculated and corrected for the amount of 2,4-dinitrotoluene which was recovered. The yield of toluene diisocyanate was 1 percent and the total yield of isocyanate products was 14 percent.

For purposes of comparison additional experiments were carried out employing a procedure similar to that of Example I except that the catalyst was solely $PdCl_2$ or solely $RhCl_3$. Not more than a trace of isocyanate was detected in these experiments.

EXAMPLES II–XXII

The procedure of Example I was repeated except that the catalyst system employed was varied as shown in Table 1. Other pertinent details are also given in Table 1 which follows:

TABLE 1

| Example | Catalyst Noble metal halide | Percent by weight [1] | Amine compound | Moles of amine compound/mole noble metal halide | Percent conversion | Percent yield TDI [2] | Total product [3] |
|---|---|---|---|---|---|---|---|
| II | PdCl₂ | 8 | N,N-Diphenyl formamide | 2:1 | 36 | 1 | 4 |
| III | PdCl₂ | 8 | Thiocarbanilide | 1:1 | 83 | 12 | 10 |
| IV | RhCl₃ | 8 | ....do.... | 1:1 | 46 | 6 | 35 |
| V | RhCl₃ | 8 | ....do.... | 1:1 | 44 | 1 | 10 |
| VI | RhCl₃ | 8 | Thiourea | 1:1 | 46 | 2 | 27 |
| VII | RhCl₃ | 8 | ....do.... | 1:1 | 38 | 3 | 37 |
| VIII | RhCl₃ | 8 | N,N-Diphenyl acetamide | 3:1 | 48 | 0 | 8 |
| IX | RhCl₃ | 8 | ....do.... | 3:1 | 31 | 2 | 18 |
| X | RhCl₃ | 8 | Carbanilide | 3:1 | 89 | 0 | 9 |
| XI | RhCl₃ | 8 | ....do.... | 3:1 | 92 | 1 | 12 |
| XII | RhCl₃ | 8 | Tetraphenyl urea | 1:1 | 16 | 0 | 10 |
| XIII | RhCl₃ | 8 | N-Phenyl thiourea | 3:1 | 66 | 0 | 14 |
| XIV | RhCl₃ | 8 | ....do.... | 3:1 | 43 | 0 | 10 |
| XV | RhCl₃ | 8 | N,N-Diphenyl thiourea | 3:1 | 47 | 0 | 39 |
| XVI | RhCl₃ | 8 | ....do.... | 3:1 | 45 | 0 | 28 |
| XVII | RhCl₃ | 8 | 2-methyl-1,3-diphenyl-2-thio-pseudo urea | 3:1 | 20 | 0 | 38 |
| XVIII | RhCl₃ | 8 | ....do.... | 3:1 | 19 | 0 | 15 |
| XIX | RhCl₃ | 8 | Diphenyl carbamyl chloride | 1:1 | 32 | 2 | 36 |
| XX | RhCl₃ | 8 | ....do.... | 1:1 | 39 | 4 | 46 |
| XXI | RhCl₃ | 8 | ....do.... | 1:1 | 22 | 6 | 22 |
| XXII | RhCl₃ | 8 | ....do.... | 3:1 | 13 | 16 | 82 |

[1] Based on weight of 2,4-dinitrotoluene employed which was 5 grams in all examples.
[2] 2,4-toluene diisocyanate.
[3] Total isocyanate product, including monoisocyanato-mononitro compounds.

EXAMPLES XXIII–XXVI

The general procedure of Example I was repeated except that different catalyst systems were employed. Details are presented below:

| Example | Catalyst system Noble metal halide | Percent by weight [1] | Amine compound | Moles of amine compound/mole noble metal halide |
|---|---|---|---|---|
| XXIII | IrBr₄ | 8 | Formamidine | 3:1 |
| XXIV | ReF₆ | 8 | Diphenyl formamidine | 2:1 |
| XXV | PtCl₄ | 8 | Guanidine | 1:1 |
| XXVI | PtCl₃ | 8 | Tetraphenyl guanidine | 2:1 |

In each example the yield of isocyanate is improved over that resulting when a noble metal halide alone is employed as the catalyst.

EXAMPLE XXVII

In this example, a complex of palladous chloride and thiocarbanilide was prepared and utilized as the catalyst in the preparation of isocyanates.

Preparation of catalyst complex

To an aqueous solution of K₂PdCl₄ there was added slowly with agitation and at room temperature an equivalent amount of thiocarbanilide dissolved in ethanol. In this instance two moles of thiocarbanilide were added for each mole of K₂PdCl₄ present in the aqueous solution. After thus prepared mixture had been stirred for several hours, a precipitate formed which was isolated by filtration, washed first with water, then with cold ethanol, recrystallized from ethanol and finally dried in vacuo at 50° C. to yield the complex

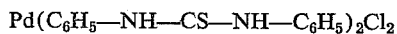

Pd(C₆H₅—NH—CS—NH—C₆H₅)₂Cl₂

Preparation of isocyanates

A total of 3.0 g. of 2,4-dinitrotoluene and 0.68 g. of the complex Pd(C₆H₅—NH—CS—NH—C₆H₅)₂Cl₂ and 0.09 g. of MoO₃ were charged to a clean 103 ml. stainless steel autoclave (316 grade) together with orthodichlorobenzene solvent (15 ml.).

The autoclave was sealed after being so charged, then pressure with nitrogen and tested for leaks. The nitrogen was released and the autoclave was pressure with carbon monoxide to about 2500 p.s.i.g. The reaction mixture was heated to 190° C. and then maintained at that temperature for 1.5 hours during which time a maximum pressure of about 4000 p.s.i.g. was attained. During the heating period, the autoclave was rocked in a rocker (36 cycles per minute). After cooling to room temperature, the autoclave was vented and the resulting reaction mixture was filtered. On subjecting the filtrate to vapor phase chromatographic analysis it was found that the yield of total isocyanate product including monoisocyanato and mononitro compounds was 14 percent, and the conversion of 2,4-dinitrotoluene was 47 percent.

What is claimed is:

1. In the process for preparing an aromatic isocyanate by reacting an aromatic nitro compound containing up to about 20 carbon atoms with carbon monoxide at an elevated temperature and an elevated pressure in the presence of a catalyst, the improvement which comprises employing as said catalyst, a catalyst system comprised of
   (I) A mixture of
   (A) an amine compound of the formula

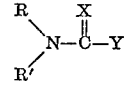

(1) wherein X is selected from the group consisting of (a) oxygen; (b) sulfur; and (c) NR·A, wherein A is an inorganic acid selected from the group consisting of
      (i) hydrochloric acid
      (ii) nitric acid and
      (iii) sulfuric acid,
   (2) wherein Y is selected from the group consisting of (d) R; (e) halogen; (f) NRR'; and (h) SR,
   (3) wherein R and R' are independently selected from the group consisting of: (i) hydrogen; (j) alkyl containing between 1 and 8 carbon atoms; (k) aryl containing between 6 and 12 carbon atoms; (l) alkaryl containing between 7 and 12 carbon atoms; (m) aralkyl containing between 7 and 12 carbon atoms; and (n) alkoxyaryl containing between 7 and 12 carbon atoms,
   (B) a noble metal compound selected from the group consisting of noble metal halides and noble metal oxides, or
   (II) a complex of a compound of I-A and a noble metal compound of I-B,
   (III) wherein the molar ratio of said amine compound to the anion of said noble metal compound in said catalyst system is in the range between about 0.1:1 and about 10:1, and (IV) wherein the noble metal of said noble metal compound is selected from the group consisting of palladium, rhodium, iridium, platinum, rhenium, ruthenium and mixtures thereof.

2. The process of claim 1 wherein the molar ratio of said amine compound to the anion of said noble metal compound is in the range between about 0.5 and about 4:1.

3. The process of claim 1 wherein the proportion of said catalyst system is between about 0.001 and about 500 weight percent of said aromatic nitro compound.

4. The process of claim 1 wherein the proportion of said catalyst system is between about 1 and about 100 weight percent of said aromatic nitro compound.

5. The process of claim 1 wherein said aromatic nitro compound is selected from the group consisting of nitrobenzene, dinitrotoluene and isocyanato-nitrotoluene.

6. The process of claim 5 wherein said catalyst system contains a third component comprised of an oxide of a metal selected from the group consisting of vanadium, molybdenum, tungsten, niobium, chromium and tantalum.

7. The process of claim 5 wherein said catalyst system is a mixture of palladous chloride and thiocarbanilide.

8. The process of claim 5 wherein said catalyst system is a mixture of rhodium trichloride and thiocarbanilide.

9. The process of claim 5 wherein said catalyst system is a mixture of rhodium trichloride and N,N-diphenyl acetamide.

10. The process of claim 5 wherein said catalyst system is a mixture of rhodium trichloride and carbanilide.

11. The process of claim 5 wherein said catalyst system is a mixture of rhodium trichloride and N,N-diphenyl thiourea.

12. The process of claim 5 wherein said catalyst system is a mixture of rhodium trichloride and diphenyl carbamyl chloride.

13. The process of claim 5 wherein said catalyst system is a mixture of rhodium trichloride and 2-methyl-1,3-diphenyl-2-thio-pseudo urea.

14. The process of claim 5 wherein said catalyst system is a mixture of palladous chloride and 2-methyl-1,3-diphenyl-2-thio-pseudo urea.

15. The process of claim 5 wherein said amine compound is selected from the group consisting of:
  (a) N,N-diphenyl formamide
  (b) N,N-dimethyl formamide
  (c) N,N-ditolyl formamide
  (d) N-tolyl-N-naphthylformamide
  (e) N,N-diphenyl acetamide
  (f) Carbanilide
  (g) Tetraphenyl urea
  (h) Thiocarbanilide
  (i) N-phenyl thiourea
  (j) N,N-diphenyl thiourea
  (k) Diphenyl carbamyl chloride
  (l) 2-methyl-1,3-diphenyl-2-thio-pseudo urea.

16. The process of claim 15 wherein said noble metal compound is selected from the group consisting of palladious chloride, rhodium trichloride, iridium trichloride, rhenium trichloride, platinium tetrachloride and mixtures thereof.

17. The process of claim 16 wherein said elevated pressure is in the range between about 30 and about 30,000 p.s.i.g., said elevated temperature is in the range between about 100° C. and about 250° C., and the proportion of carbon monoxide is in the range between about 3 and about 50 moles of carbon monoxide per nitro group in said aromatic nitro compound.

18. The process of claim 16 wherein said aromatic nitro compound is selected from the group consisting of nitrobenzene, dinitrotoluene, and isocyanato-nitrotoluene.

19. The process of claim 18 wherein the proportion of said catalyst system is between about 1 and about 100 weight percent of said aromatic nitro compound.

20. The process of claim 19 wherein the molar ratio of said amine compound to the anion of said noble metal compound is between 0.5:1 and 4:1.

21. The process of claim 20 wherein said elevated pressure is in the range between about 100 and about 20,000 p.s.i.g., said elevated temperature is in the range between about 100° C. and 250° C., and the proportion of carbon monoxide is in the range between about 8 and about 15 moles of carbon monoxide per nitro group in said aromatic nitro compound.

22. The process of claim 20 wherein said catalyst system contains a third component comprised of an oxide of a metal selected from the group consisting of vanadium, molybdenum, tungsten, niobium, chromium and tantalum.

23. The process of claim 22 wherein said oxide of a metal is selected from the group consisting of chromic oxide ($Cr_2O_3$), chromium dioxide, $CrO_2$), and chromous oxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$), vanadium pentoxide ($V_2O_5$), and mixtures thereof.

References Cited
UNITED STATES PATENTS 3,461,149   8/1969   Hardy et al. _____ 260—453

CHARLES B. PARKER, Primary Examiner

D. H. TORRENCE, Assistant Examiner

U.S. Cl. X.R.

252—429 A, 429 C, 430; 260—243 A, 346.3, 429 R, 430, 476 R